J. SABO.
GAME TRAP.
APPLICATION FILED JUNE 16, 1915.
1,224,670.
Patented May 1, 1917.
2 SHEETS—SHEET 1.
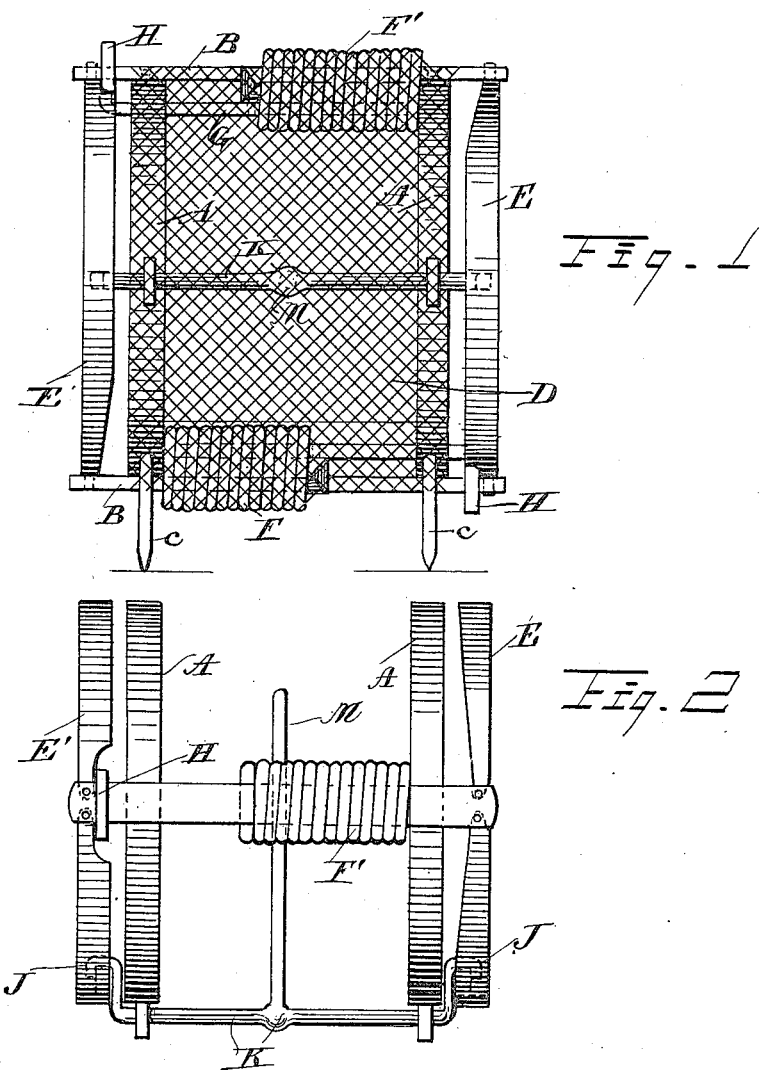

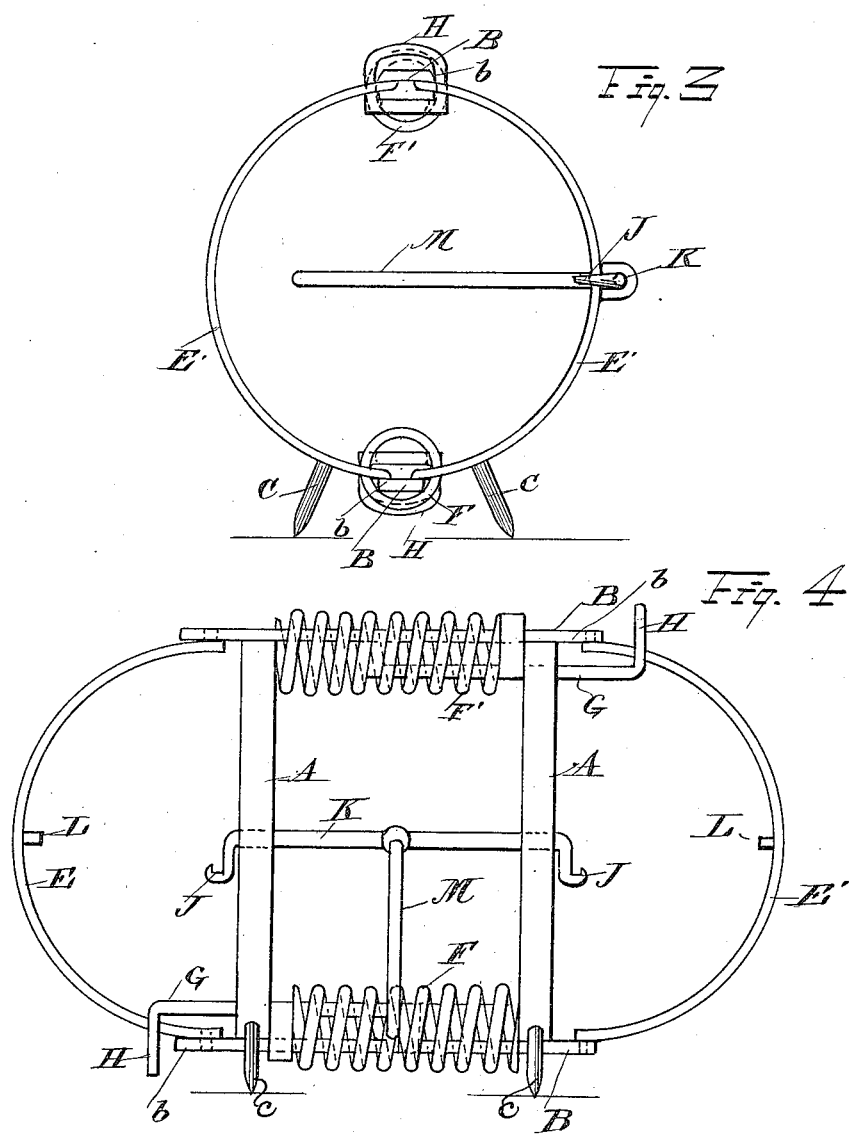

UNITED STATES PATENT OFFICE.

JOHN SABO, OF CLEVELAND, OHIO.

GAME-TRAP.

1,224,670.     Specification of Letters Patent.     Patented May 1, 1917.

Application filed June 16, 1915. Serial No. 34,369.

*To all whom it may concern:*

Be it known that I, JOHN SABO, a citizen of the United States, and resident of Cleveland, in the county of Cuyahoga and State of Ohio, have invented certain new and useful Improvements in Game-Traps, of which I hereby declare the following to be a full, clear, and exact description, such as will enable others skilled in the art to which it appertains to make and use the same.

The objects of the invention are to provide a form of animal trap for game animals in particular, which is adapted to be placed in the path or burrow of the animal, and which will not present any obstruction to prevent it from being inserted in the opening in which the wild animal may have made his home, or is using as a runway.

It is also so arranged as to be free from projecting parts over which the animal would have to step and would therefore appear suspicious to it, and prevent it from coming into the trap.

The invention includes a skeleton frame comprising circular and end portions in which corresponding pairs of hinged jaws are pivoted and providing a double form of trap through which the animal is compelled to pass, and which will be sprung by the animal when entering from either end, and which therefore will leave no opportunity for escape in either direction.

The invention further includes the double sets of spring operated jaws and a releasing trigger or device common to both sets of jaws.

The invention further comprises the combination and arrangement of parts and construction of details hereinafter described, shown in the accompanying drawings and specifically pointed out in the claims.

In the accompanying drawings Figure 1 is a side elevation of the device showing an inclosing netting; Fig. 2 is a plan view thereof showing the jaws open; Fig. 3 is an end elevation thereof; Fig. 4 is a side elevation showing the jaws closed.

In these views the frame is preferably composed of terminal metal rings A, A, connected by means of longitudinal bars B B, and provided with pointed legs c, c, or retaining means which can be driven into the edge of the opening in the ground or in a tree.

It is designed that this frame shall be entirely concealed within the opening or burrow, so as to permit the animal to pass through it without perceiving or treading upon any obstruction. For this reason the frame is made of as few parts as possible.

If desired it can be inclosed in a netting D to prevent the animal from entering and going out in any manner except through the ends; with the inclosing netting it could be used as a fish trap, the bait being attached to the central trigger.

E, E and E', E', are the jaws, one pair being hinged upon the connecting bars B, B, at each end of the trap thus making it double and catching the animal when either coming or going. The jaws are operated respectively by means of heavy springs F, F' which for convenience encircle the bars B, B, and also the throw bars G, G, against which the springs press.

The throw bars are provided with eyes H, H, which when the jaws are open encircle the projections b, b, of the bars, and when the throw bars are propelled forward by the springs, the eyes H, H encircle each pair of jaws and close them tightly together. One spring operates each pair of jaws.

When the jaws are open and are under powerful spring pressure, they are releasably retained from closing by means of the revoluble keepers J, J, mounted upon the shaft K and engaging a lug L upon one of each pair of jaws.

These keepers are operated by an arm M which projects across the opening in the trap and must be encountered by the animal in passing through the trap. The arm is so placed that either an upward movement thereof as when an animal passes underneath, or a downward movement as when the animal presses down upon it will spring the jaws.

From the method of construction it is almost impossible for the animal to escape being caught if it enters the trap.

The trap is constructed in several sizes adapted to the sizes of the animals which it is desired to catch.

Having described the invention what I claim as new and desire to secure by Letters Patent is:

1. In an animal trap, in combination, a tubular skeleton frame, pairs of spring pressed jaws pivotally secured to the frame, a retaining device for each pair of jaws, and a common operating means therefor, said operating means released from within said frame.

2. In an animal trap, in combination, a skeleton frame including terminal rings and longitudinal connecting members, a pair of spring propelled jaws pivoted in each end of said frame, a releasable keeper for each pair of jaws and a common operating device for said keepers, said operating device located in said frame intermediate of said terminal rings.

3. In an animal trap, in combination, a skeleton frame, including terminal rings and longitudinal connecting members, pairs of jaws pivoted upon projecting portions of said longitudinal members, throw bars slidingly movable in said frame and provided each with an eye encircling one pair of jaws near the pivotal points thereof, and a spring for operating each throw bar, substantially as described.

4. In an animal trap, a frame having a central passage, and formed without projecting parts whereby it can be introduced into an opening, a pair of spring pressed jaws at each end of said frame, adapted to engage an animal entering from either end, a keeper for each pair of jaws, and a releasing device for said keepers, operable by the animal passing through the trap.

5. In an animal trap, a skeleton frame having a central passage, a pair of spring pressed jaws pivoted in each end of said frame, a releasing device operable by the animal passing through said frame, and a netting inclosing said frame, to limit the movement of the animal to the central passage.

6. In an animal trap, a skeleton frame comprising terminal rings, and connecting longitudinal bars, a pair of jaws hinged to the ends of the connecting bars, a throw bar slidably movable on each longitudinal connecting bar, each throw bar having an eye encircling one pair of jaws, an operating spring for each pair of jaws encircling each longitudinal bar and its accompanying throw bar, a keeper for each pair of jaws, and a releasing device for said keepers, operable by the animal entering the trap.

In testimony whereof, I hereunto set my hand this 10th day of June 1915.

JOHN SABO.

In presence of—
 LAD E. KREJCI,
 WM. M. MONROE.

Copies of this patent may be obtained for five cents each, by addressing the "Commissioner of Patents. Washington, D. C."